US011220070B2

(12) United States Patent
Zhao et al.

(10) Patent No.: US 11,220,070 B2
(45) Date of Patent: Jan. 11, 2022

(54) APPARATUS AND METHOD FOR MAKING COMPOSITE SHAFTS

(71) Applicant: GOODRICH CORPORATION, Charlotte, NC (US)

(72) Inventors: Wenping Zhao, Glastonbury, CT (US); Nathaniel M. Gray, Stratham, NH (US); Daniel O. Ursenbach, Caledonia, IL (US)

(73) Assignee: Goodrich Corporation, Charlotte, NC (US)

( * ) Notice: Subject to any disclaimer, the term of this patent is extended or adjusted under 35 U.S.C. 154(b) by 177 days.

(21) Appl. No.: 16/533,670

(22) Filed: Aug. 6, 2019

(65) Prior Publication Data

US 2021/0039336 A1   Feb. 11, 2021

(51) Int. Cl.
*B29C 70/32* (2006.01)
*B29L 31/00* (2006.01)

(52) U.S. Cl.
CPC ........... *B29C 70/32* (2013.01); *B29L 2031/75* (2013.01); *F16C 2226/36* (2013.01)

(58) Field of Classification Search
None
See application file for complete search history.

(56) References Cited

U.S. PATENT DOCUMENTS

| | | | |
|---|---|---|---|
| 3,313,670 A * | 4/1967 | Sherwood | ............... B29C 53/60 |
| | | | 156/359 |
| 4,473,420 A * | 9/1984 | Medney | ............... B29C 53/588 |
| | | | 156/172 |
| 7,810,754 B2 | 10/2010 | Uozumi et al. | |
| 8,113,457 B2 | 2/2012 | Tanigawa et al. | |
| 8,403,251 B2 | 3/2013 | Uozumi et al. | |
| 8,424,793 B2 | 4/2013 | Aiyama | |
| 8,679,606 B2 | 3/2014 | Parfrey | |
| 8,813,805 B2 * | 8/2014 | Nakanishi | ........... B29C 53/8066 |
| | | | 156/429 |
| 9,486,966 B2 | 11/2016 | Hatta et al. | |
| 9,662,807 B2 | 5/2017 | Feeney et al. | |
| 9,688,508 B2 * | 6/2017 | Tanigawa | ................ B29C 70/32 |
| 2003/0051795 A1 * | 3/2003 | Burgess | .................. B29C 53/68 |
| | | | 156/169 |

(Continued)

FOREIGN PATENT DOCUMENTS

| | | |
|---|---|---|
| EP | 0042248 | 12/1981 |
| EP | 0087384 | 8/1983 |

OTHER PUBLICATIONS

European Patent Office, European Search Report dated Jul. 29, 2020 in Application No. 19214868.2.

*Primary Examiner* — Jeffry H Aftergut
(74) *Attorney, Agent, or Firm* — Snell & Wilmer L.L.P.

(57) ABSTRACT

An apparatus for forming a composite shaft may comprise an axial fiber strip dispensing assembly and a hoop fiber strip dispensing assembly. The axial fiber strip dispensing assembly may include a plurality of fiber strip guides located circumferentially about a center axis. The plurality of fiber strip guides may be configured to dispense a plurality of circumferentially adjacent first fiber strips with the plurality of circumferentially adjacent first fiber strips extending in a generally axial direction. The hoop fiber strip dispensing assembly may be configured to dispense a second fiber strip circumferentially about the center axis.

20 Claims, 15 Drawing Sheets

(56) References Cited

U.S. PATENT DOCUMENTS

2009/0065622 A1\* 3/2009 Uozumi ................ B29C 53/70
                                                                                                    242/410
2015/0329315 A1\* 11/2015 Hatta ................... B65H 81/00
                                                                                                    242/436

\* cited by examiner

APPARATUS AND METHOD FOR MAKING COMPOSITE SHAFTS

FIELD

The present disclosure relates to composite shafts, and, more specifically, to an apparatus and method for forming composite shafts.

BACKGROUND

Shafts are generally cylindrically-shaped components, which are typically made of metal. Fabrication of metal shafts can be time consuming and costly due to the long lead-time of forging and significant machining. Composite shafts tend to be lighter weight, as compared to metal shafts; however, formation of composite shafts is also slow and costly, as the layers of composite are generally applied one strip at a time. Additionally, the axial loading capability needed for shafts that experience axial loads leads to manufacturing challenges as placing axially-dominated fibers using filament winding presents manufacturing difficulties.

SUMMARY

An apparatus for forming a composite shaft is disclosed herein. In accordance with various embodiments, the apparatus may comprise an axial fiber strip dispensing assembly and a first hoop fiber strip dispensing assembly. The axial fiber strip dispensing assembly may include a plurality of fiber strip guides located circumferentially about a center axis. The plurality of fiber strip guides may be to dispense a plurality of circumferentially adjacent first fiber strips with the plurality of circumferentially adjacent first fiber strips extending in a generally axial direction. The first hoop fiber strip dispensing assembly may be configured to dispense a second fiber strip circumferentially about the center axis. The first hoop fiber strip dispensing assembly may be configured to orient the second fiber strip such that a plurality of second fibers of the second fiber strip extends circumferentially about the center axis.

In various embodiments, a second hoop fiber strip dispensing assembly may be configured to dispense a third fiber strip circumferentially about the center axis. The second hoop fiber strip dispensing assembly may be configured to orient the third fiber strip such that a plurality of third fibers of the third fiber strip extends circumferentially about the center axis.

In various embodiments, the first hoop fiber strip dispensing assembly may be configured to dispense the second fiber strip while translating in a first axial direction, and the second hoop fiber strip dispensing assembly may be configured to dispense the third fiber strip while translating in a second axial direction opposite the first axial direction.

In various embodiments, a shaft support may be configured to translate the composite shaft axially relative to the axial fiber strip dispensing assembly. In various embodiments, the first hoop fiber strip dispensing assembly may include a consolidation element.

In various embodiments, the axial fiber strip dispensing assembly may further comprise a plurality of first fiber strip spools located circumferentially about the axial fiber strip dispensing assembly. The first hoop fiber strip dispenser assembly may further comprise the second fiber strip and a second fiber strip spool configured to dispense the second fiber strip.

In various embodiments, at least one of a fiber density, a fiber volume, or a fiber count of a first fiber strip dispensed from a first fiber strip spool of the plurality of first fiber strip spools may be different from at least one of a fiber density, a fiber volume, or a fiber count of the second fiber strip, the plurality of circumferentially adjacent first fiber strips including the first fiber strip.

In various embodiments, the axial fiber strip dispensing assembly may comprise a plurality of first fiber strip spools and a plurality of second fiber strip spools. The plurality of second fiber strip spools may be axially staggered with respect to the plurality of first fiber strip spools.

A method of forming a composite shaft is disclosed herein. In accordance with various embodiments, the method may comprise the steps of unspooling a first portion of a plurality of axial fiber strips over a shaft base, coupling the first portion of the plurality of axial fiber strips to the shaft base by applying heat and radially inward pressure to the first portion of the plurality of axial fiber strips, translating the shaft base in a first axial direction to unspool a second portion of the plurality of axial fiber strips over the first portion of the plurality of axial fiber strips, coupling the second portion of the plurality of axial fiber strips to the first portion of the plurality of axial fiber strips by applying heat and radially inward pressure to the second portion of the plurality of axial fiber strips, and translating the shaft base in a second axial direction to unspool a third portion of the plurality of axial fiber strips over the second portion of the plurality of axial fiber strip.

In various embodiments, the step of coupling the first portion of the plurality of axial fiber strips to the shaft base by applying heat and radially inward pressure to the first portion of the plurality of axial fiber strips may comprise depositing a first hoop fiber strip over the first portion of the of the plurality of axial fiber strips.

In various embodiments, the step of depositing the first hoop fiber strip over the first portion of the of the plurality of axial fiber strips may comprise translating a first hoop fiber strip dispensing assembly circumferentially about the shaft base and in the first axial direction.

In various embodiments, the step of coupling the second portion of the plurality of axial fiber strips to the first portion of the plurality of axial fiber strips by applying heat and radially inward pressure to the second portion of the plurality of axial fiber strips may comprise depositing a second hoop fiber strip over the second portion of the plurality of axial fiber strips.

In various embodiments, the step of depositing the second hoop fiber strip over the second portion of the plurality of axial fiber strips may comprise translating a second hoop fiber strip dispensing assembly circumferentially about the shaft base and in the second axial direction.

In various embodiments, the step of coupling the first portion of the plurality of axial fiber strips to the shaft base by applying heat and radially inward pressure to the first portion of the plurality of axial fiber strips may comprise translating a first consolidation element over the shaft base in the first axial direction, and the step of coupling the second portion of the plurality of axial fiber strips to the first portion of the plurality of axial fiber strips by applying heat and radially inward pressure to the second portion of the plurality of axial fiber strips may comprise translating a second consolidation element over the shaft base in the second axial direction.

An apparatus for forming a composite shaft is also disclosed herein. In accordance with various embodiments, the apparatus may comprise an axial fiber strip dispensing assembly and a first consolidation element. The axial fiber strip dispensing assembly may include a plurality of fiber strip guides located circumferentially about a center axis. The axial fiber strip dispensing assembly may be configured to dispense a plurality of circumferentially adjacent fiber strips. Each fiber strip of the plurality of circumferentially adjacent fiber strips may include a plurality of fibers. The axial fiber strip dispensing assembly may be configured to orient the plurality of circumferentially adjacent fiber strips such that the plurality of fibers extend in a generally axial direction. The first consolidation element may be configured to apply heat and radially inward pressure against the plurality of circumferentially adjacent fiber strips. The first consolidation element may be configured to translate axially towards the axial fiber strip dispensing assembly.

In various embodiments, a second consolidation element may be located on a side of the axial fiber strip dispensing assembly opposite the first consolidation element. The second consolidation element may be configured to apply heat and radially inward pressure against the plurality of circumferentially adjacent fiber strips. The second consolidation element may be configured to translate axially towards the axial fiber strip dispensing assembly.

In various embodiments, the first consolidation element may be configured to translate in a circumferential direction. In various embodiments, the axial fiber strip dispensing assembly may be configured to dispense the plurality of circumferentially adjacent fiber strips adjacent to one another such that the plurality of fiber strips jointly form an annular structure extending approximately 360° about a center axis.

In various embodiments, the plurality of circumferentially adjacent fiber strips comprises at least one of pre-impregnated carbon fiber tow or slit fiber tape. In various embodiments, the plurality of circumferentially adjacent fiber strips comprises dry fiber strips.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not be necessarily be repeated herein for the sake of clarity.

A first component that is "radially outward" of a second component means that the first component is positioned at a greater distance away from a common axis of the first and second components as compared to the second component. A first component that is "radially inward" of a second component is positioned closer to a common axis of the first and second components than the second component. In the case of components that rotate circumferentially about a common axis, a first component that is radially inward of a second component rotates through a circumferentially shorter path than the second component.

Figure 1:
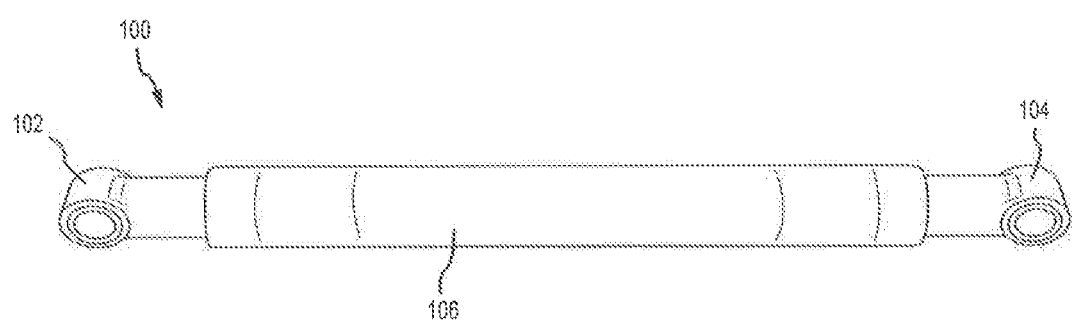
FIG. 1 illustrates a component prior to deposition of composite fiber layers, in accordance with various embodiments.

Referring to FIG. 1, a component 100 is illustrated, in accordance with various embodiments. Component 100 may include a first end member 102 and a second end member 104. In various embodiments, first and second end members 102, 104 may be formed of a metal or metal alloy. A shaft base 106 may extend from first end member 102 to second end member 104. As described in further detail below, shaft base 106 may support deposition of one or more composite fiber layers between first end member 102 and second end member 104. In various embodiments, shaft base 106 may comprise a resin, for example, a thermosetting resin (e.g., epoxies, polyimides, etc.) or a thermoplastic resin (e.g., polyether ether ketone, polyetherimide, polyphenylene sulfide, etc.).

Figure 2A:
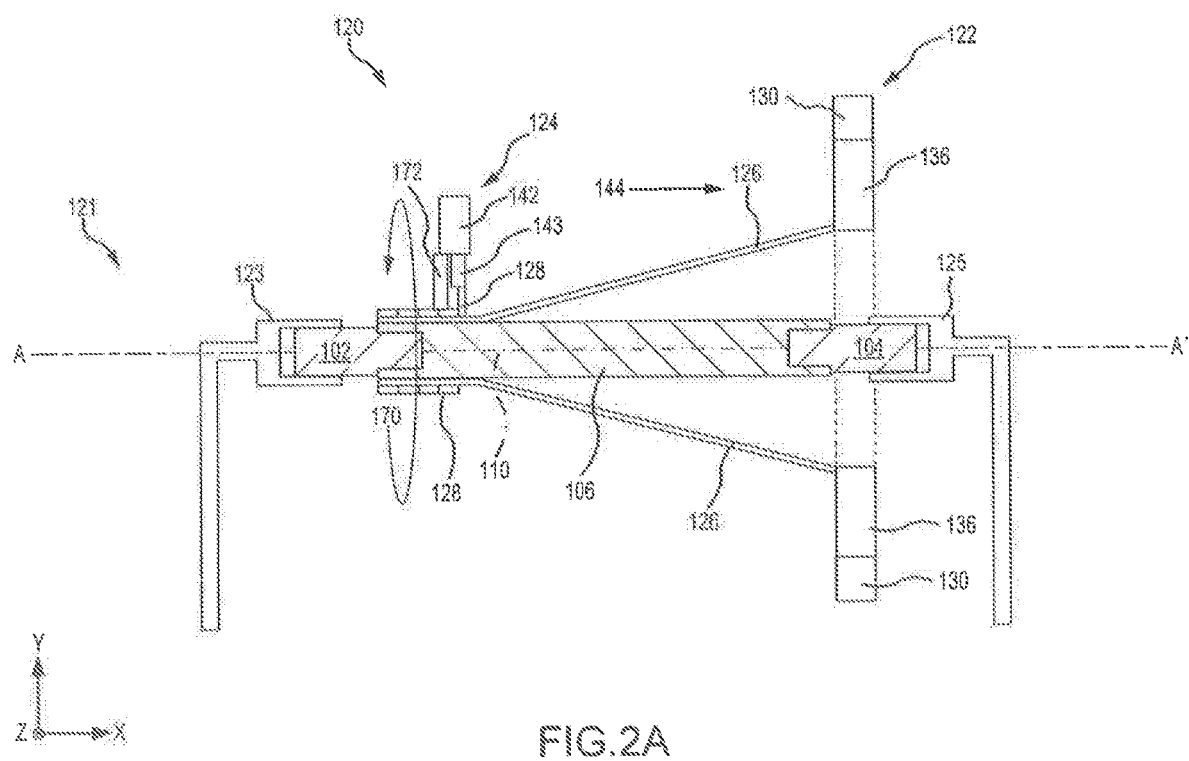
FIGS. 2A, 2B, 2C, 2D, 2E, 2F, 2G, and 2H illustrate an apparatus depositing axial fiber strips and hoop fiber strips over a shaft base to form a component having a composite shaft, in accordance with various embodiments.

With reference to FIG. 2A, an apparatus 120 for forming a composite shaft is illustrated, in accordance with various embodiments. Apparatus 120 includes an axial fiber dispensing assembly 122 and a first hoop fiber dispensing assembly 124. Axial fiber dispensing assembly 122 is configured to simultaneously dispense a plurality of axial (or first) fiber strips 126 over shaft base 106. Axial fiber strips 126 may extend axially from first end member 102 to second end member 104. Axial fiber dispensing assembly 122 is configured to dispense axial fiber strips 126 circumferentially adjacent to one another. In this regard, axial fiber strips 126 may extend approximately 360° about a center axis 110 of shaft base 106 and/or about a center axis A-A' of apparatus 120.

As used herein, the terms "axial" and "axially" refer to directions parallel to a center axis A-A' of apparatus 120. As used herein, the terms "radial" and "radially" refer to directions normal to center axis A-A'. As used herein, the terms "circumferential" and "circumferentially" refer to directions about center axis A-A'.

In various embodiments, apparatus 120 includes a shaft support assembly 121. Shaft support assembly 121 supports component 100 and/or shaft base 106 during application of the fiber strips on shaft base 106. Shaft support assembly 121 is configured to align center axis 110 of shaft base 106 with center axis A-A' of apparatus 120 such that center axis 110 and center axis A-A' are coplanar. In various embodiments, shaft support assembly 121 may include a first support arm 123 and a second support arm 125 located axially opposite first support arm 123.

Figure 2B:
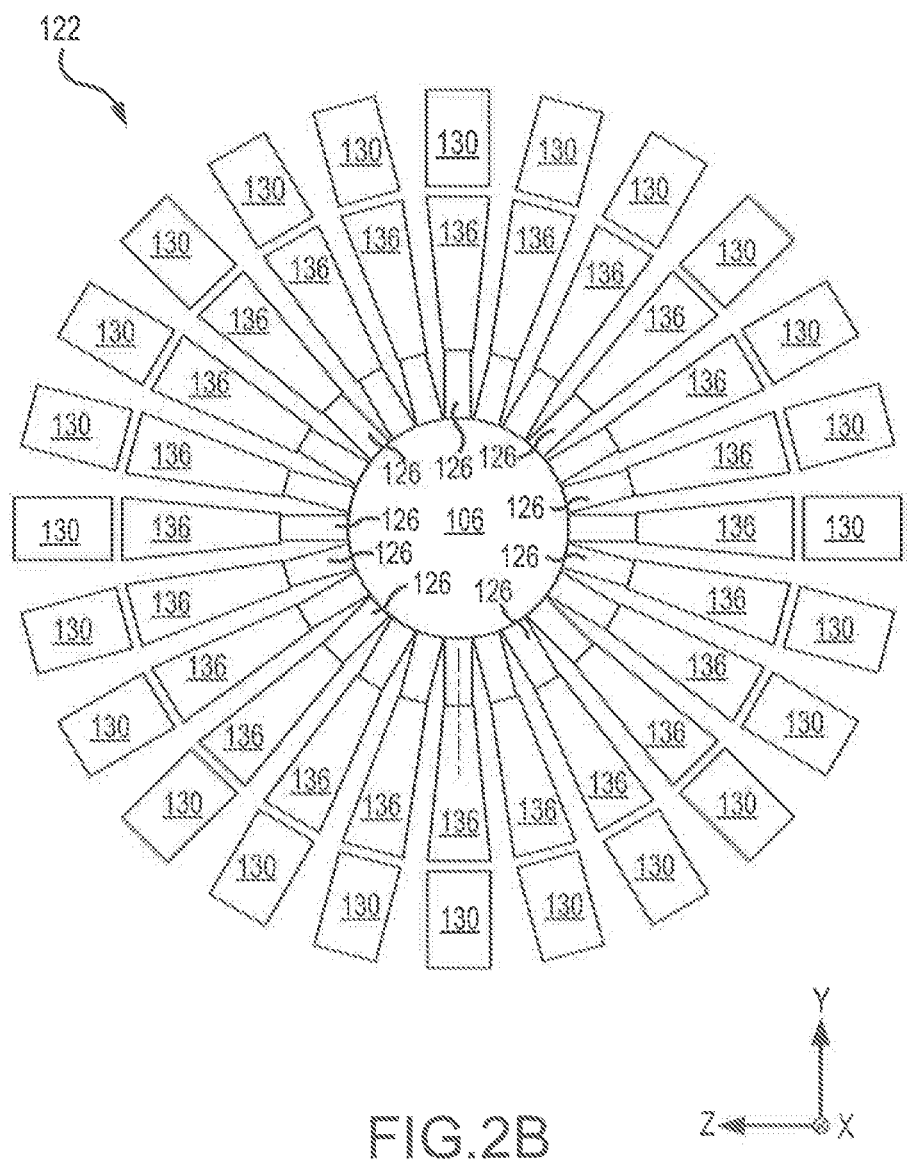

With reference to FIG. 2B, an axially facing view of axial fiber dispensing assembly 122 is illustrated, in accordance with various embodiments. Axial fiber dispensing assembly 122 includes a plurality of fiber strip spools 130. In various embodiments, fiber strip spools 130 are located circumferentially about center axis A-A' of apparatus 120. Each fiber strip spool 130 is configured to dispense an axial fiber strip 126. Stated differently, each axial fiber strip 126 is dispensed from a fiber strip spool 130.

Figure 4A:
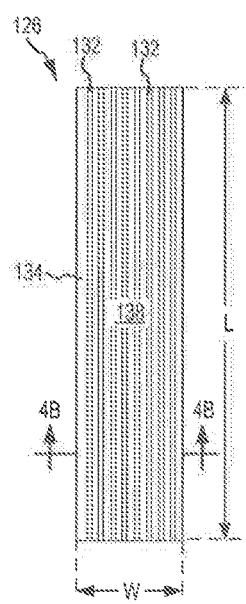
FIGS. 4A and 4B illustrate a plan view and a cross-section view, respectively, of an axial fiber strip, in accordance with various embodiments.
Figure 4B:

With reference to FIGS. 4A and 4B, a plan view and a cross-section view, respectively, of portion of an axial fiber strip 126 are illustrated. In accordance with various embodiments, axial fiber strip 126 comprises a plurality of fibers 132. Fibers 132 extend in a longitudinal direction or along the length L of fiber strips 126. In this regard, axial fiber strips 126 include a length (or first dimension) L, a width (or second dimension) W, and a height (or third dimension) H. Height H may be substantially less than the length and width, such that axial fiber strips 126 display flexibility relative to the plane formed by the first and second dimensions.

Fibers 132 may be carbon fibers, glass fibers, ceramic fibers, synthetic fibers such as poly-paraphenylene terephthalamide (KEVLAR), or any other suitable fiber. In various embodiments, fibers 132 are located within a matrix 134 of axial fiber strip 126. Matrix 134 may comprise a thermosetting material (e.g., a thermosetting epoxy resin, thermosetting polyimide resin, etc.), a thermoplastic material (e.g., polyether ether ketone, polyetherimide, polyphenylene sulfide, etc.), or any other suitable matrix material. Fiber strips 126 may comprise pre-impregnated carbon fiber tow, slit fiber tape, or any other fiber reinforced material. In various embodiments, fiber strips 126 may comprise dry fiber strips (i.e., fiber strips which do not include a matrix).

Fiber strips 126 include a fiber count, a fiber volume, and a fiber density. As used herein, "fiber volume" refers to the percentage or fraction of a specified volume within a fiber strip that is occupied by fibers. As used herein, "fiber density" refers to the mass of fibers contained in a specified volume within a fiber strip. As used herein, "fiber count" refers to the number of fibers contained in a specified volume within a fiber strip.

With combined reference to FIGS. 2B, 4A and 4B, in accordance with various embodiments, axial fiber dispensing assembly 122 includes a plurality of fiber strip guides 136. In various embodiments, fiber strip guides 136 are located circumferentially about center axis A-A' of apparatus 120. Fiber strip guides 136 are configured to orient axial fiber strips 126 such that a first surface 138 of axial fiber strips 126 is oriented radially inward (i.e., toward center axis A-A') and a second surface 140 of axial fiber strips 126 is oriented radially outward (i.e., away from center axis A-A'). Fiber strip guides 136 are further configured to position axial fiber strips 126 on shaft base 106 such that width W of axial fiber strips 126 is oriented in a circumferential direction and length L is oriented in a generally axial direction. In this regard, fiber strip guides 136 are configured to orient axial fiber strips 126 circumferentially adjacent to one another with fibers 132 oriented in a generally axial direction. For example, fibers 132 may extend from first end member 102 to second end member 104 and may be generally parallel to center axis A-A' and center axis 110. It is contemplate and understood that portions of fibers 132 may be non-parallel to center axis A-A' and center axis 110 depending on the shape and contour of shaft base 106. For example, portions of axial fibers may be oriented at an angle other 0° relative to center axis A-A' and center axis 110 due to variation in the diameter of shaft base 106 and/or to other desired fiber designs.

Returning to FIG. 2A, first hoop fiber dispensing assembly 124 is configured to deposit a first hoop fiber strip (or second fiber strip) 128 circumferentially about shaft base 106. First hoop fiber strip 128 may be a single fiber strip that extends continuously about center axis 110 of shaft base 106 and from first end member 102 to second end member 104.

First hoop fiber dispensing assembly 124 includes a hoop fiber strip spool 142. In various embodiments, hoop fiber strip spool 142 is located radially outward from shaft base 106 and axial fiber strips 126, such that axial fiber strips 126 are located radially between hoop fiber strip spool 142 and shaft base 106. Hoop fiber strip spool 142 is configured to dispense first hoop fiber strip 128. Stated differently, first hoop fiber strip 128 is dispensed from hoop fiber strip spool 142.

Figure 5A:
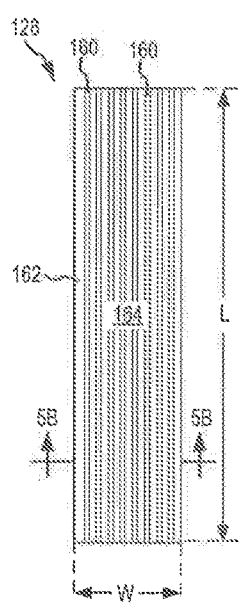
FIGS. 5A and 5B illustrate a plan view and a cross-section view, respectively, of hoop fiber strip, in accordance with various embodiments.
Figure 5B:

With reference to FIGS. 5A and 5B, a plan view and a cross-section view, respectively, of portion of first hoop fiber strip 128 are illustrated, In accordance with various embodiments, first hoop fiber strip 128 comprises a plurality of fibers 160. Fibers 160 extend in a longitudinal direction or along the length L of first hoop fiber strip 128. In this regard, first hoop fiber strip 128 includes a length (or first dimension) L, a width (or second dimension) W, and a height (or third dimension) H. The height of first hoop fiber strip 128 may be substantially less than the length and width, such that first hoop fiber strip 128 displays flexibility relative to the plane formed by the first and second dimensions.

Fibers 160 may be carbon fibers, glass fibers, ceramic fibers, synthetic fibers such as poly-paraphenylene terephthalamide (KEVLAR), or any other suitable fiber. In various embodiments, fibers 160 are located within a matrix 162 of first hoop fiber strip 128. Matrix 162 may comprise a thermosetting material (e.g., a thermosetting epoxy resin, thermosetting polyimide resin, etc.), a thermoplastic material (e.g., polyether ether ketone, polyetherimide, polyphenylene sulfide, etc.), or any other suitable matrix material. First hoop fiber strip 128 may comprise pre-impregnated carbon fiber tow, slit fiber tape, or any other fiber reinforced material. In various embodiments, First hoop fiber strip 128 may comprise a dry fiber strip (i.e., a fiber strip which does not include a matrix).

With combined reference to FIGS. 2A, 4A, 5A, and 5B, first hoop fiber strip 128 includes a fiber count, a fiber volume, and a fiber density. In various embodiments, at least one of the fiber count, the fiber volume, and/or the fiber density of first hoop fiber strip 128 may be different from the he fiber count, the fiber volume, and/or the fiber density of axial fiber strips 126. In various embodiments, the fibers 132 of axial fiber strips 126 may be different from the fibers 160 of first hoop fiber strip 128. For example, when forming a composite shaft for an applications that experiences increased axial loads and relatively small hoop stresses, fibers 132 may have greater axial stiffness as compared to fibers 160 (e.g., fibers 132 may be carbon fibers and fibers 160 may be glass fibers).

In accordance with various embodiments, first hoop fiber dispensing assembly 124 includes a hoop fiber strip guide assembly 143. Hoop fiber strip guide 143 is configured to orient first hoop fiber strip 128 such that a first surface 164 of first hoop fiber strip 128 is oriented radially inward (i.e., toward center axis A-A') and a second surface 166 of first hoop fiber strip 128 is oriented radially outward (i.e., away from center axis A-A'). Hoop fiber strip guide 143 is also configured to position first hoop fiber strip 128 on shaft base 106 such that width W of first hoop fiber strip 128 is oriented in a generally axial direction and length L of first hoop fiber strip 128 is oriented in a generally circumferential direction. In this regard, hoop fiber strip guide 143 is configured to orient first hoop fiber strip 128 circumferentially with fibers 160 extending circumferentially about center axis A-A' and center axis 110. In various embodiments, first hoop fiber strip 128 may extend continuously from first end member 102 to second end member 104.

First hoop fiber dispensing assembly 124 is configured to translate circumferentially about center axes A-A', 110 (e.g., in the direction of arrow 170) and axially toward axial fiber dispensing assembly 122 (e.g., in the direction of arrow 144) to deposit first hoop fiber strip 128. Deposition of first hoop fiber strip 128 couples, or ties down, the axial fiber strips 126 that are radially inward of first hoop fiber strip 128 to shaft base 106. In various embodiments, the positioning of fiber strip spools 130 and fiber strip guides 136 causes axial fiber strips 126 to be located radially outward of, or spaced apart from, shaft base 106 prior to deposition of first hoop fiber strip 128. In this regard, deposition of first hoop fiber strip 128 may translate axial fiber strips 126 radially inward and onto and/or into contact with shaft base 106. In various embodiments, during deposition of first hoop fiber strip 128 and axial fiber strips 126, shaft base 106 and axial fiber dispensing assembly 122 may remain stationary. Stated differently, first hoop fiber dispensing assembly 124 may translate circumferentially and axially, while shaft base 106 and axial fiber dispensing assembly 122 remain stationary.

In various embodiments, shaft base 106 and/or axial fiber dispensing assembly 122 may be translated circumferentially a preselected number of degrees (e.g. 20°, 10°, 2°, etc.), during deposition of first hoop fiber strip 128 and axial fiber strips 126, such that a first end of each axial fiber strip 126 is circumferentially offset from a second end of each axial fiber strip. The first ends of axial fiber strips 126 are located at first end member 102 and the second ends of axial fiber strips 126 are located at second end member 104. For example, in various embodiments, shaft support assembly 121 may rotate shaft base 106 during the deposition of the fiber strips such that the first ends of axial fiber strips 126 are circumferentially offset from the second ends of axial fiber strips 126 by 3°, as measured about center axis 110.

In various embodiments, first hoop fiber dispensing assembly 124 may include a consolidation element 172. Consolidation element 172 may be configured to apply heat and/or pressure to deposited first hoop fiber strip 128 and axial fiber strips 126. The application of heat and/or pressure by consolidation element 172 may melt the matrices of first hoop fiber strip 128 and/or axial fiber strips 126, such that in response to consolidation, the matrices of first hoop fiber strip 128 and/or axial fiber strips 126 are bonded together. In various embodiments, shaft base 106, matrix 134 of axial fiber strips 126, and/or matrix 162 of first hoop fiber strip 128 are the same material. In various embodiments, the application of heat and/or pressure by consolidation element 172 may also melt portions of shaft base 106, such that in response to consolidation, the matrices of first hoop fiber strip 128 and/or axial fiber strips 126 are bonded to shaft base 106.

Figure 2C:
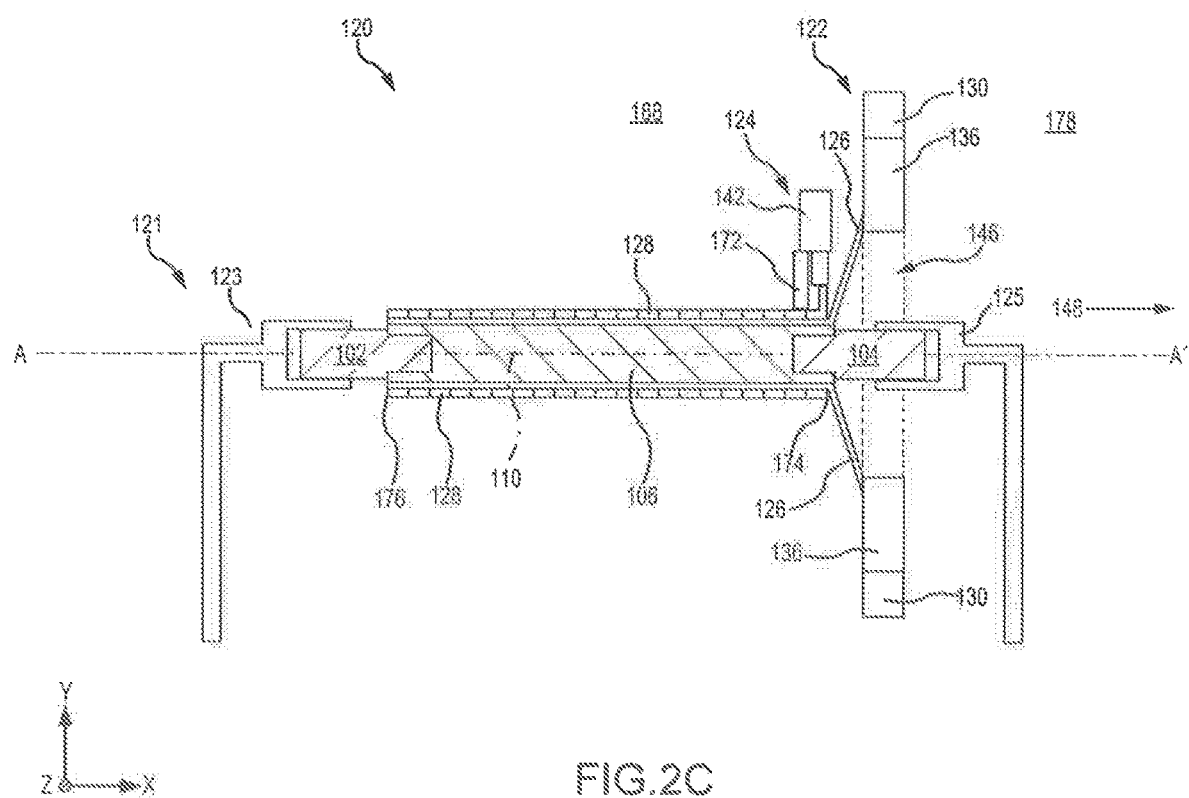

Referring to FIG. 2C, first hoop fiber dispensing assembly 124 continues to translate circumferentially about shaft base 106 and axially toward axial fiber dispensing assembly 122, thereby depositing first hoop fiber strip 128 and axial fiber strips 126 on shaft base 106, until first hoop fiber dispensing assembly 124 reaches what will be a first axial end 174 of the composite shaft and/or reaches axial fiber dispensing assembly 122. Stated differently, deposition of first hoop fiber strip 128 and axial fiber strips 126 stops, in response to first hoop fiber dispensing assembly 124 translating to first axial end 174 of the composite shaft. After first hoop fiber dispensing assembly 124 reaches first axial end 174, first hoop fiber strip 128 is cut and shaft base 106 is translated axially through a central opening 146 in axial fiber dispensing assembly 122. In this regard, shaft support assembly 121 may translate component 100 in a first axial direction (e.g., in the direction of arrow 148). Component 100 may be translated in the direction of arrow 148 until what will form a second axial end 176 of the composite shaft is located on a side 178 of axial fiber dispensing assembly 122 that is opposite first hoop fiber dispensing assembly 124.

Figure 2D:
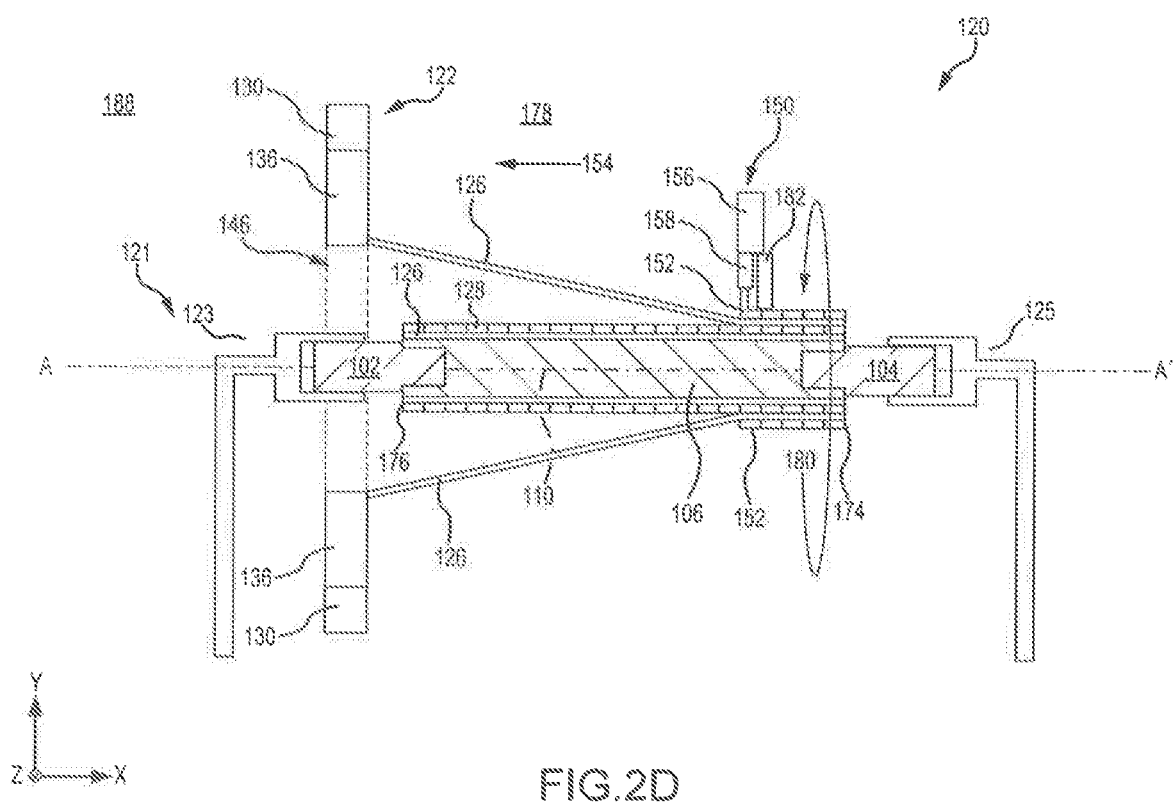

With reference to FIG. 2D, in various embodiments, apparatus 120 further includes a second hoop fiber dispensing assembly 150. Second hoop fiber dispensing assembly 150 is located on the side 178 of axial fiber dispensing assembly 122 that is opposite first hoop fiber dispensing assembly 124. Translation of shaft support assembly 121 to side 178 of axial fiber dispensing assembly 122 causes axial fiber strips 126, which remain coupled to shaft base 106 by first hoop fiber strip 128, to unspool from fiber strip spools 130.

Second hoop fiber dispensing assembly 150 is configured to deposit a second hoop fiber strip (or a third fiber strip) 152 circumferentially about shaft base 106. Second hoop fiber strip 152 may be similar to first hoop fiber strip 128 in FIGS. 5A and 5B. Second hoop fiber strip 152 may be a single fiber strip that extends continuously about center axis 110 of shaft base 106 and from second end member 104 to first end member 102.

Second hoop fiber dispensing assembly 150 includes a hoop fiber strip spool 156 and hoop fiber strip guide 158 similar to hoop fiber strip spool 142 and hoop fiber strip guide 143 of first hoop fiber dispensing assembly 124. Hoop fiber strip spool 156 and hoop fiber strip guide 158 are located radially outward of axial fiber strips 126, such that axial fiber strips 126 are located radially between previously deposited first hoop fiber strip 128 and hoop fiber strip spool 156 and hoop fiber strip guide 158.

Hoop fiber strip guide 158 is configured to position second hoop fiber strip 152 such that the width W of second hoop fiber strip 152 is oriented in a generally axial direction and the length L of second hoop fiber strip 152 is oriented in a generally circumferential direction. In this regard, hoop fiber strip guide 158 is configured to orient second hoop fiber strip 152 circumferentially with the fibers of second hoop fiber strip 152 extending circumferentially about center axis A-A' and center axis 110. In various embodiments, second hoop fiber strip 152 may extend continuously from second end member 104 to first end member 102.

Second hoop fiber dispensing assembly 150 is configured to translate circumferentially about center axes A-A', 110 (e.g., in the direction of arrow 180) and axially toward axial fiber dispensing assembly 122 (e.g., in the direction of arrow 154) to deposit second hoop fiber strip 152. Deposition of second hoop fiber strip 152 couples, or ties down, the axial fiber strips 126 that are radially inward of second hoop fiber strip 152 to previously deposited first hoop fiber strip 128 and/or axial fiber strips 126. In various embodiments, the positioning of fiber strip spools 130 and fiber strip guides 136 causes axial fiber strips 126 to be located radially outward of, or spaced apart from, from the previously deposited fiber strips. In this regard, deposition of second hoop fiber strip 152 may translate axial fiber strips 126 radially inward and onto and/or into contact with the previously deposited fiber strips. In various embodiments, during deposition of second hoop fiber strip 152 and axial fiber strips 126, shaft base 106 and axial fiber dispensing assembly 122 may remain stationary. Stated differently, second hoop fiber dispensing assembly 150 may translate circumferentially and axially, while shaft base 106 and axial fiber dispensing assembly 122 remain stationary.

In various embodiments, shaft base 106 and/or axial fiber dispensing assembly 122 may be translated circumferentially a preselected number of degrees (e.g. 20°, 10°, 2°, etc.), during deposition of second hoop fiber strip 152 and axial fiber strips 126, such that the first ends of axial fiber strips 126 are circumferentially offset from the second ends of axial fiber strips 126.

In various embodiments, second hoop fiber dispensing assembly 150 may include a consolidation element 182, similar to consolidation element 172 of first hoop fiber dispensing assembly 124. Consolidation element 182 is configured to apply heat and/or pressure to deposited second hoop fiber strip 152 and axial fiber strips 126. The application of heat and/or pressure by consolidation element 182 may melt the matrices of second hoop fiber strip 152 and/or axial fiber strips 126, such that in response to consolidation, the matrices of second hoop fiber strip 152 and/or axial fiber strips 126 are bonded together and to the previously deposited fiber strips.

Figure 2E:
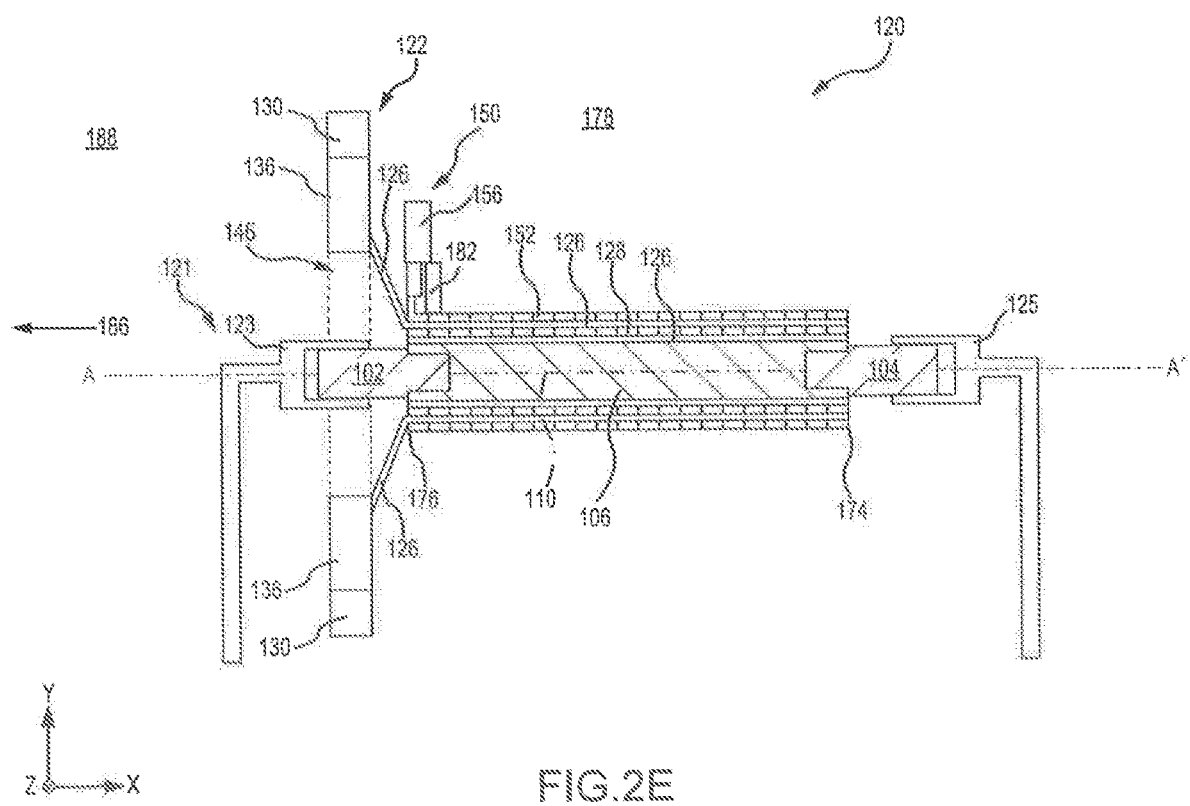

Referring to FIG. 2E, second hoop fiber dispensing assembly 150 continues to translate circumferentially and axially, thereby depositing second hoop fiber strip 152 and axial fiber strips 126 on the previously deposited fiber strips, until second hoop fiber dispensing assembly 150 reaches first end member 102 and/or axial fiber dispensing assembly 122. Stated differently, in response to second hoop fiber dispensing assembly 150 translating to what will be second axial end 176 of the composite shaft, deposition of second hoop fiber strip 152 and axial fiber strips 126 stops. After second hoop fiber dispensing assembly 150 reaches second axial end 176, second hoop fiber strip 152 is cut and shaft base 106 is translated axially through central opening 146 in axial fiber dispensing assembly 122. In this regard, shaft support assembly 121 may translate component 100 in a second axial direction (e.g., in the direction of arrow 186). Component 100 may be translated until what will form first axial end 174 is located on a side 188 of axial fiber dispensing assembly 122 that is opposite second hoop fiber dispensing assembly 150.

Figure 2F:
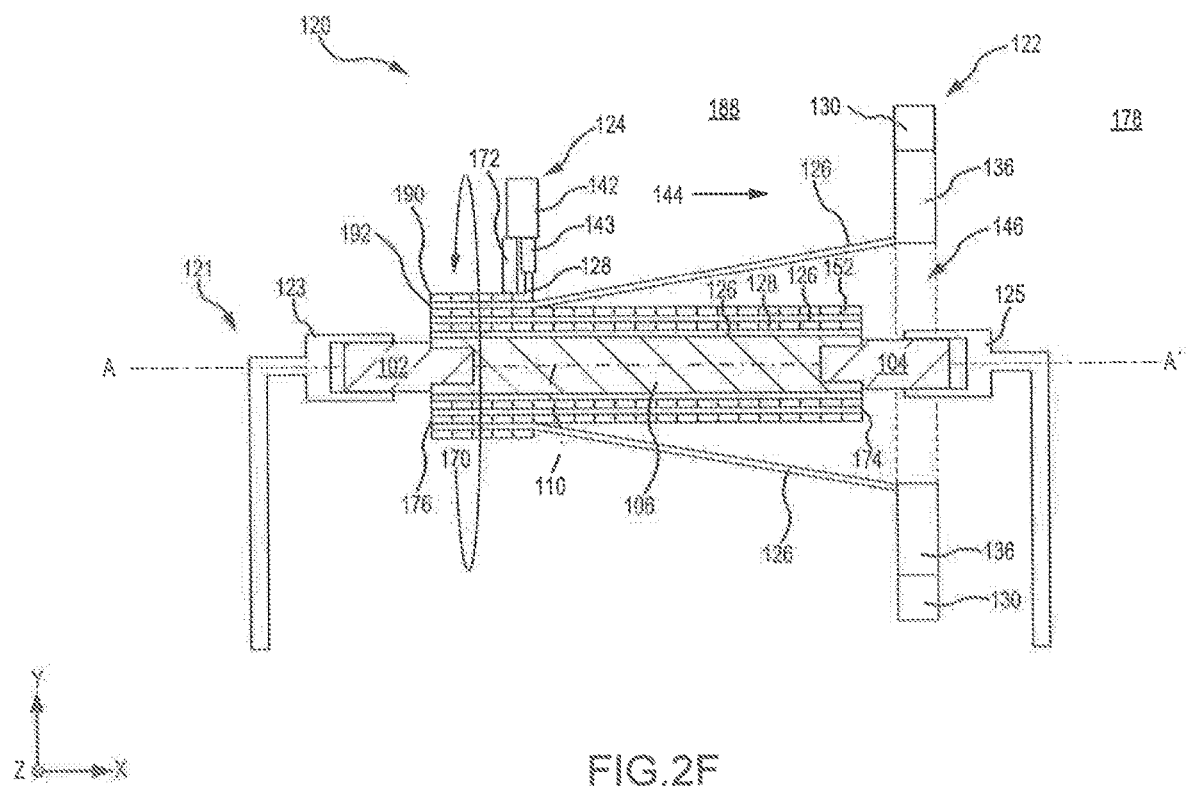

Referring to FIG. 2F, translation of first axial end 174 to side 188 of axial fiber dispensing assembly 122 causes axial fiber strips 126, which remain coupled to shaft base 106 by second hoop fiber strip 152, to unspool from fiber strip spools 130. Hoop fiber strip spool 142 and hoop fiber strip guide 143 are located radially outward of the unspooled axial fiber strips 126, such that axial fiber strips 126 are located radially between the previously deposited second hoop fiber strip 152 and hoop fiber strip guide 143.

First hoop fiber dispensing assembly 124 translates circumferentially about center axes A-A', 110 and axially toward axial fiber dispensing assembly 122 to deposit a new layer 190 of first hoop fiber strip 128 and a new layer 192 of axial fiber strips 126 over the previously deposited fiber strips. Deposition of new layer 190 couples, or ties down, new layer 192 of axial fiber strips 126 to the previously deposited fiber strips. Consolidation element 172 applies heat and/or pressure to new layers 190, 192. The application of heat and/or pressure by consolidation element 172 may melt the matrices of new layer 190 and/or new layer 192, such that in response to consolidation, the matrices of new layer 190 and new layer 192 are bonded together and to the previously deposited fiber strips.

Figure 2G:
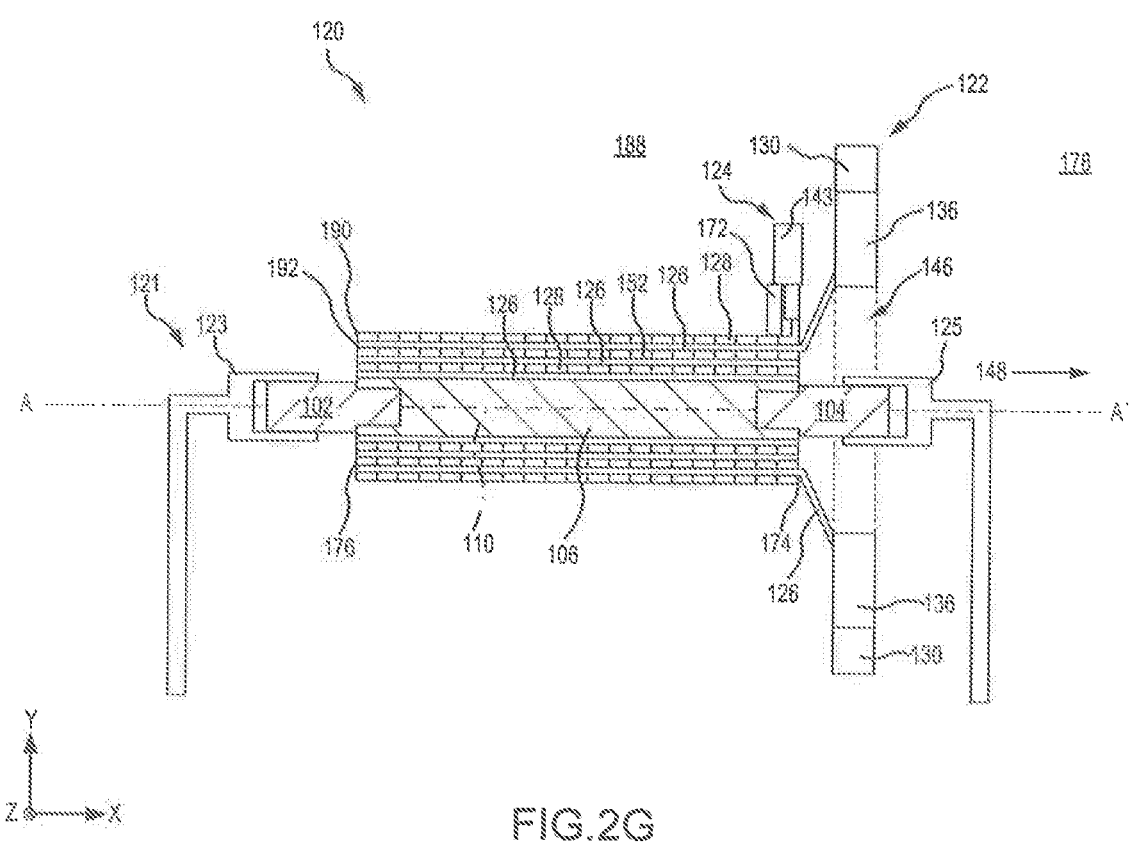

Referring to FIG. 2G, first hoop fiber dispensing assembly 124 continues to translate circumferentially and axially, thereby depositing new layer 190 of first hoop fiber strip 128 and new layer 192 of axial fiber strips 126 on the previously deposited fiber strips, until first hoop fiber dispensing assembly 124 reaches first axial end 174 and/or axial fiber dispensing assembly 122. Stated differently, deposition of new layer 190 of first hoop fiber strip 128 and new layer 192 of axial fiber strips 126 stops, in response to first hoop fiber dispensing assembly 124 translating to first axial end 174. After first hoop fiber dispensing assembly 124 reaches first axial end 174, first hoop fiber strip 128 is cut and shaft base 106 is translated axially through central opening 146 in axial fiber dispensing assembly 122. Component 100 may be translated until second axial end 176 is located on side 178 of axial fiber dispensing assembly 122.

Figure 2H:
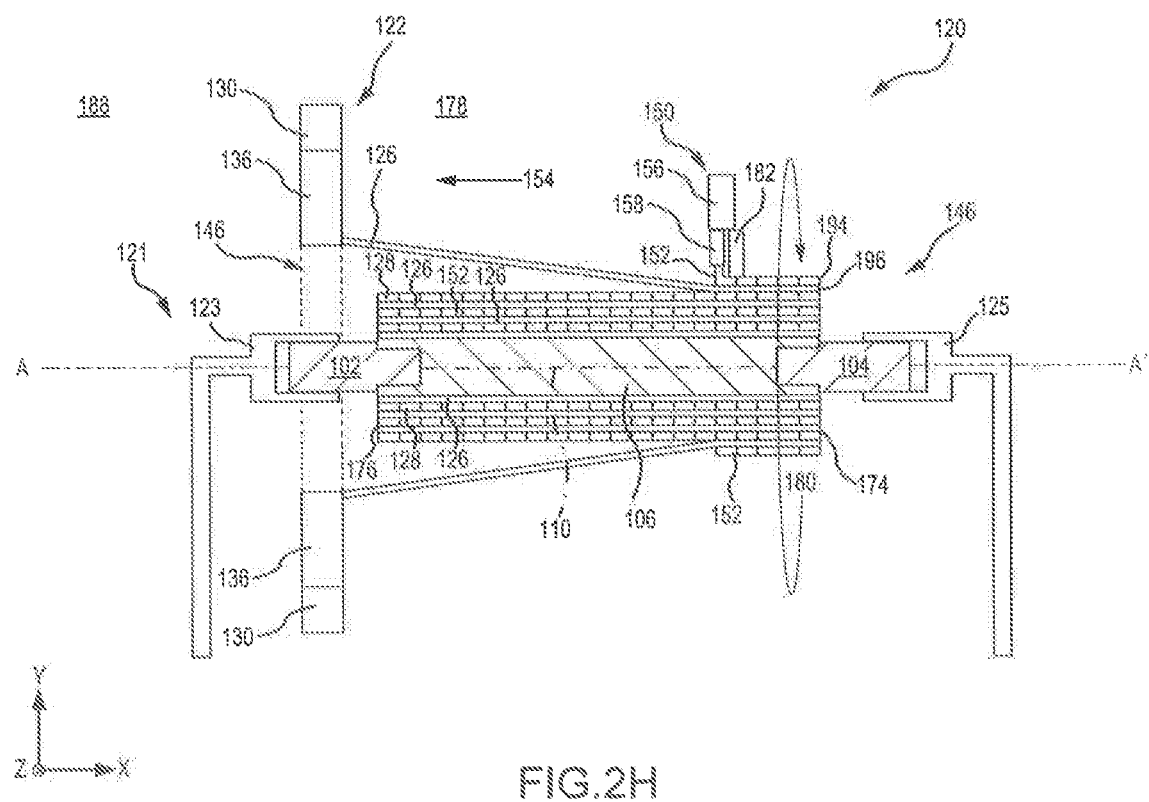

Referring to FIG. 2H, translation of second axial end 176 to side 178 of axial fiber dispensing assembly 122 causes axial fiber strips 126, which remain coupled to shaft base 106 by new layer 190 of first hoop fiber strip 128, to unspool from fiber strip spools 130. Hoop fiber strip spool 156 and hoop fiber strip guide 158 of second hoop fiber dispensing assembly 150 are located radially outward of the unspooled axial fiber strips 126, such that axial fiber strips 126 are located radially between the previously deposited new layer 190 of first hoop fiber strip 128 and hoop fiber strip guide 158.

Second hoop fiber dispensing assembly 150 translates circumferentially about center axes A-A', 110 and axially toward axial fiber dispensing assembly 122 to deposit a new layer 194 of second hoop fiber strip 152 and a new layer 196 of axial fiber strips 126 over the previously deposited fiber strips. Deposition of new layer 196 of second hoop fiber strip 152 couples, or ties down, new layer 192 of axial fiber strips 126 to the previously deposited fiber strips. Consolidation element 182 applies heat and/or pressure to new layers 194, 196. The application of heat and/or pressure by consolidation element 182 may melt the matrices of new layer 194 and/or new layer 196, such that in response to consolidation, the matrices of new layer 194 and new layer 196 are bonded together and to the previously deposited fiber strips.

Second hoop fiber dispensing assembly 150 continues to translate circumferentially and axially, thereby depositing new layer 194 of second hoop fiber strip 152 and new layer 196 of axial fiber strips 126 on the previously deposited fiber strips, until second hoop fiber dispensing assembly 150 reaches first end member 102 and/or axial fiber dispensing assembly 122. Stated differently, deposition of new layer 194 of second hoop fiber strip 152 and new layer 196 of axial fiber strips 126 stops, in response to second hoop fiber dispensing assembly 150 translating to second axial end 176 of the composite shaft. After second hoop fiber dispensing assembly 150 reaches second axial end 176, second hoop fiber strip 152 is cut and shaft base 106 is translated axially through central opening 146 in axial fiber dispensing assembly 122. The above process continues until a desired number of fiber strip layers are deposited.

Figure 3:
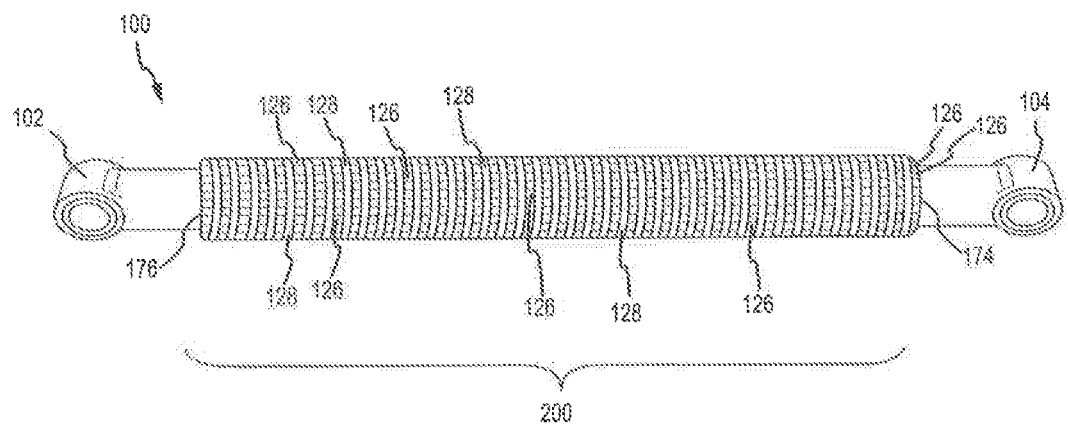
FIG. 3 illustrates a component having a composite shaft, in accordance with various embodiments.

FIG. 3 shows component 100 including a fully formed composite shaft 200. Composite shaft 200 is comprised of multiple alternating layers of axially oriented fibers and circumferentially oriented fibers distributed in a cured matrix material. Composite shaft 200 extends from first end member 102 to second end member 104. In various embodiments, component 100 including composite shaft 200 may form an aircraft component. For example, component 100 including composite shaft 200 may comprise a shaft, strut, axle, or any other aircraft component.

While the disclosed apparatus, methods, and/or composite shafts may find particular use in connection with aircraft components, various aspects of the disclosed embodiments may be adapted for performance in a variety of fields. As such, numerous applications of the present disclosure may be realized.

Figure 6A:
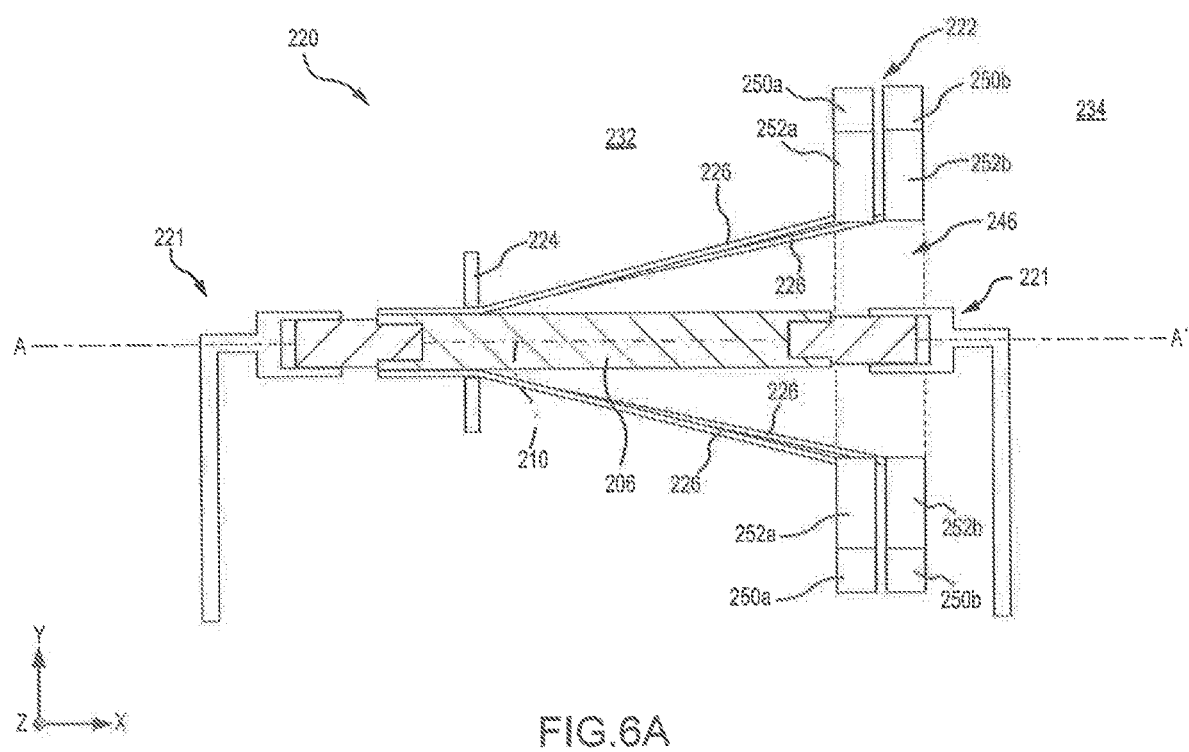
FIGS. 6A, 6B, and 6C illustrate an apparatus depositing axial fiber strips to form a composite shaft, in accordance with various embodiments.
Figure 6B:
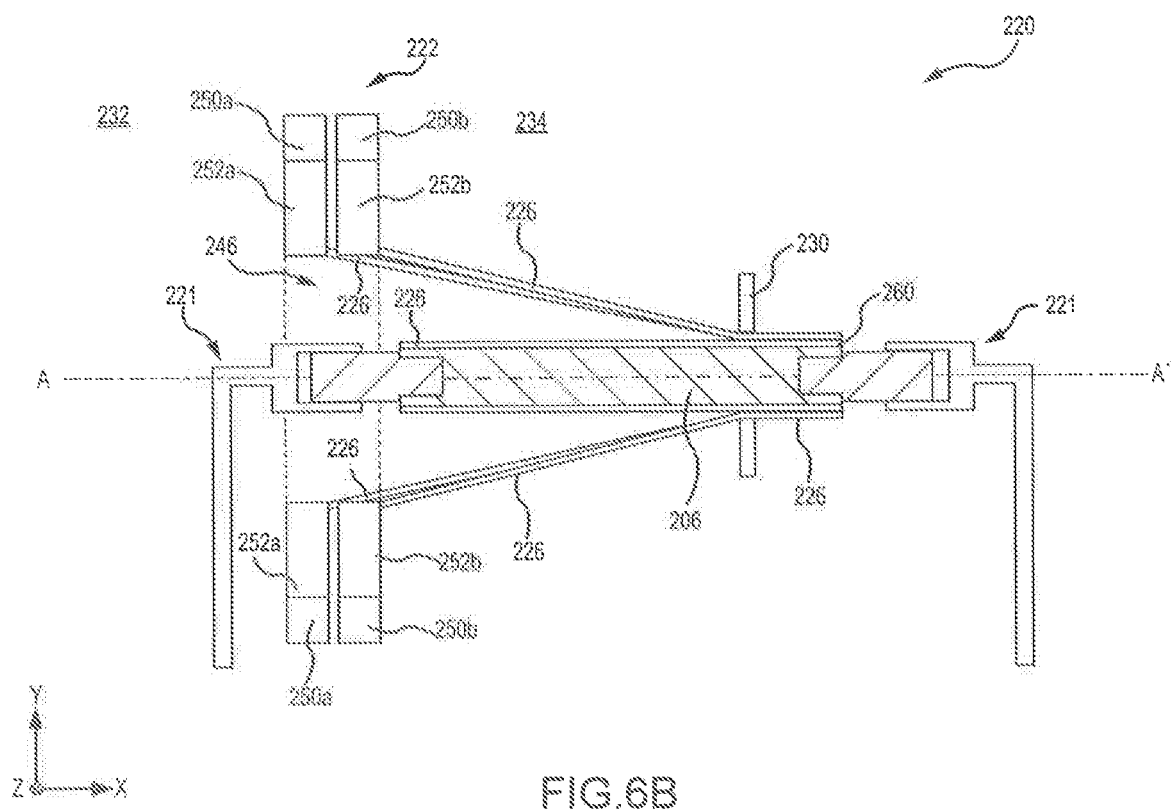

With reference to FIGS. 6A and 6B, an apparatus 220 for forming a composite shaft is illustrated, in accordance with various embodiments. Apparatus 220 includes an axial fiber dispensing assembly 222, similar to axial fiber dispensing assembly 122 of apparatus 120. Axial fiber dispensing assembly 222 is configured to simultaneously dispense a plurality of axial (or first) fiber strips 226 over a shaft base 206. In various embodiments, apparatus 220 includes a shaft support assembly 221, which may be similar to shaft support assembly 121 of apparatus 120.

Apparatus 220 further includes a first consolidation element 224 and a second consolidation element 230. First consolidation element 224 is located on a side 232 of axial fiber dispensing assembly 222 that is opposite second consolidation element 230. Second consolidation element 230 is located on a side 234 of axial fiber dispensing assembly 222 that is opposite first consolidation element 224. First consolidation element 224 is configured to be located radially outward of unspooled axial fiber strips 226, such that axial fiber strips 226 are located radially between first consolidation element 224 and shaft base 206 and/or radially between first consolidation element 224 and previously deposited axial fiber strips 226. Second consolidation element 230 is also configured to be located radially outward of unspooled axial fiber strips 226, such that axial fiber strips 226 are located radially between second consolidation element 230 and shaft base 206 and/or radially between second consolidation element 224 and previously deposited axial fiber strips 226.

Figure 6C:
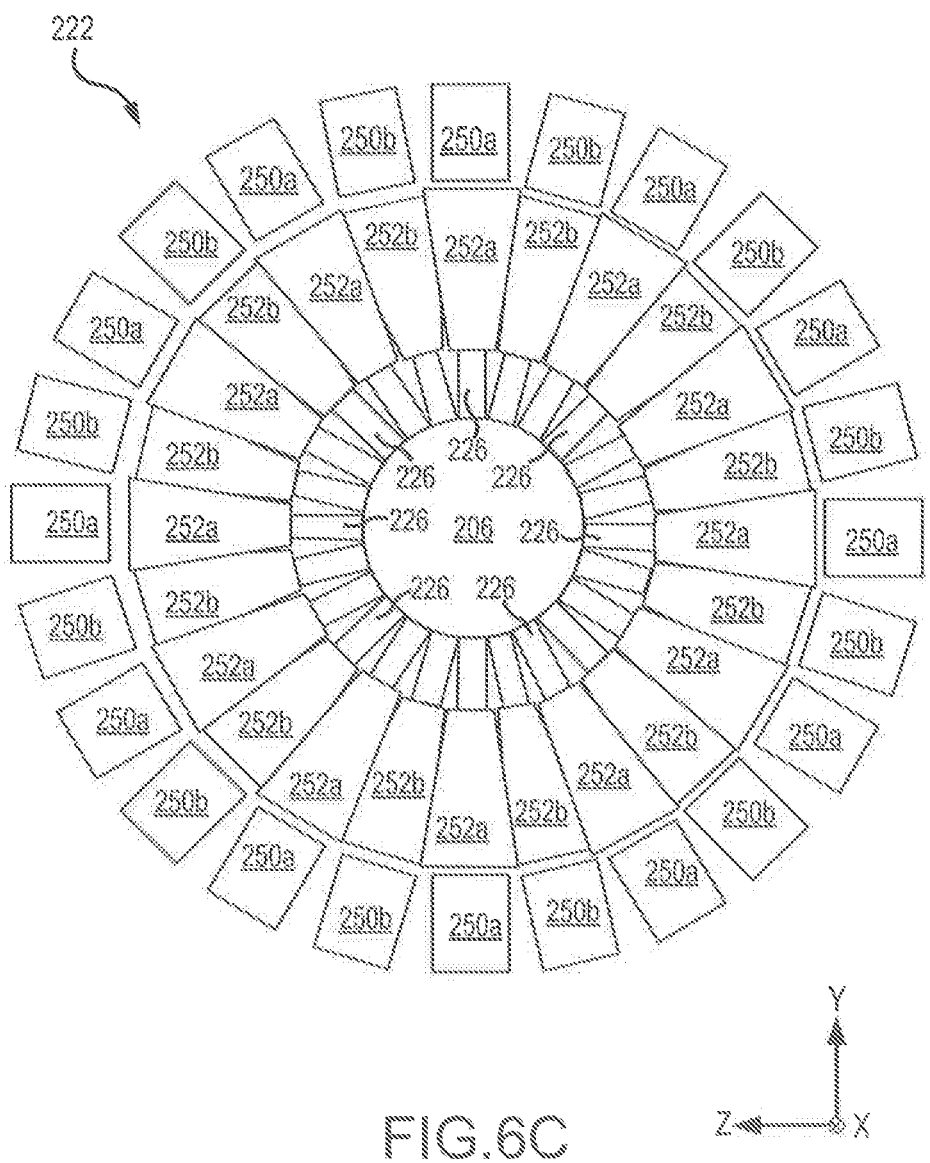

With reference to FIG. 6C, an axially facing view of axial fiber dispensing assembly 222 is illustrated, in accordance with various embodiments. Axial fiber dispensing assembly 222 includes a plurality of fiber strip spools, including first fiber strip spools 250a and second fiber strip spools 250b. First and second fiber strip spools 250a, 250b are located circumferentially about center axis A-A' of apparatus 220. Each of the first and second fiber strip spools 250a, 250b is configured to dispense an axial fiber strip 226. Stated differently, axial fiber strips 226 are dispensed from first and second fiber strip spools 250a, 250b.

Axial fiber dispensing assembly 222 further includes a plurality of fiber strip guides, including first fiber strip guides 252a and second fiber strip guides 252b. In various embodiments, first and second fiber strip guides 252a, 252b are located circumferentially about center axis A-A' of apparatus 220. First fiber strip guides 252a are configured to orient the axial fiber strips 226 dispensed from first fiber strip spools 250a in a generally axial direction. Second fiber strip guides 252b are configured to orient the axial fiber strips 226 dispensed from second fiber strip spools 250b in a generally axial direction.

With combine reference to FIGS. 6A, 6B, and 6C, in various embodiments, first fiber strip spools 250a and/or first fiber strip guides 252a may be axially staggered with respect to second fiber strip spools 250b and/or second fiber strip guides 252b. In this regard, first fiber strip spools 250a and/or first fiber strip guides 252a may be located proximate (i.e., closer to) first consolidation element 224 as compared, respectively, to second fiber strip spools 250b and/or second fiber strip guides 252b, and second fiber strip spools 250b and/or second strip guides 252b may be located proximate (i.e., closer to) second consolidation element 230 as compared, respectively, to first fiber strip spools 250a and/or first fiber strip guides 252a. In various embodiments, fiber strip spools 130 and/or fiber strip guides 136 of axial fiber dispensing assembly 122 in FIG. 2A may be axially staggered similar to first and fiber strip spools 250a, 250b and first and fiber strip guides 252a, 252b.

Referring now to FIG. 6A, first consolidation element 224 is configured to apply heat and radially inward pressure against axial fiber strips 226. The application of heat and pressure by first consolidation element 224 couples, or ties down, axial fiber strips 226 to shaft base 206 and/or to previously deposited axial fiber strips 226. In various embodiments, the positioning of fiber strip spools 250a, 250b and fiber strip guides 252a, 252b of axial fiber dispensing assembly 222 causes axial fiber strips 226 to be located radially outward of (i.e., spaced apart from) shaft base 206 and/or of the previously deposited axial fiber strips 226. In this regard, application of radially inward pressure by first consolidation element 224 may translate axial fiber strips 226 radially inward and onto and/or into contact with shaft base 206 and/or with the previously deposited axial fiber strips 226. First consolidation element 224 is configured to translate axially toward axial fiber dispensing assembly 222. In various embodiments, first consolidation element 224 may also translate circumferentially about center axis A-A'. In various embodiments, during deposition of axial fiber strips 226, shaft base 206 and axial fiber dispensing assembly 222 may remain stationary. Stated differently, first consolidation element 224 may translate, while shaft base 206 and axial fiber dispensing assembly 222 remain stationary.

In accordance with various embodiments, first consolidation element 224 translates axially, thereby depositing axial fiber strips 226, until first consolidation element 224 reaches a first axial end of the composite shaft and/or reaches axial fiber dispensing assembly 222. After first consolidation element reaches the first axial end of the composite shaft, shaft base 206 is translated axially through central opening 246 in axial fiber dispensing assembly 222.

Referring now to FIG. 6B, in response to translation of shaft base 206 to side 234 of axial fiber dispensing assembly 222, axial fiber strips 226 unspool and second consolidation element 230 begins applying heat and radially inward pressure against a new layer 260 of axial fiber strips 226. The application of heat and pressure by second consolidation element 230 couples, or ties down, the new layer 260 of axial fiber strips 226 to the previously deposited axial fiber strips 226. In various embodiments, the positioning of fiber strip spools 250 and fiber strip guides 252 of axial fiber dispensing assembly 222 causes axial fiber strips 226 to be located radially outward of the previously deposited axial fiber strips. In this regard, application of radially inward pressure by second consolidation element 230 may translate axial fiber strips 226 radially inward and onto and/or into contact with the previously deposited axial fiber strips 226. Second consolidation element 230 is configured to translate axially toward axial fiber dispensing assembly 222. In various embodiments, second consolidation element 230 may also translate circumferentially about center axis A-A'. In various embodiments, during deposition of axial fiber strips 226, shaft base 206 and axial fiber dispensing assembly 222 may remain stationary. Stated differently, second consolidation element 230 may translate, while shaft base 206 and axial fiber dispensing assembly 222 remain stationary.

In accordance with various embodiments, second consolidation element 230 translates axially, thereby depositing axial fiber strips 226, until second consolidation element 230 reaches a second axial end of the composite shaft and/or reaches axial fiber dispensing assembly 222. After second consolidation element 230 reaches the second axial end, shaft base 206 is translated axially through central opening 246 in axial fiber dispensing assembly 222. The process continues until a desired number of axial fiber strips 226 are deposited.

Figure 7:
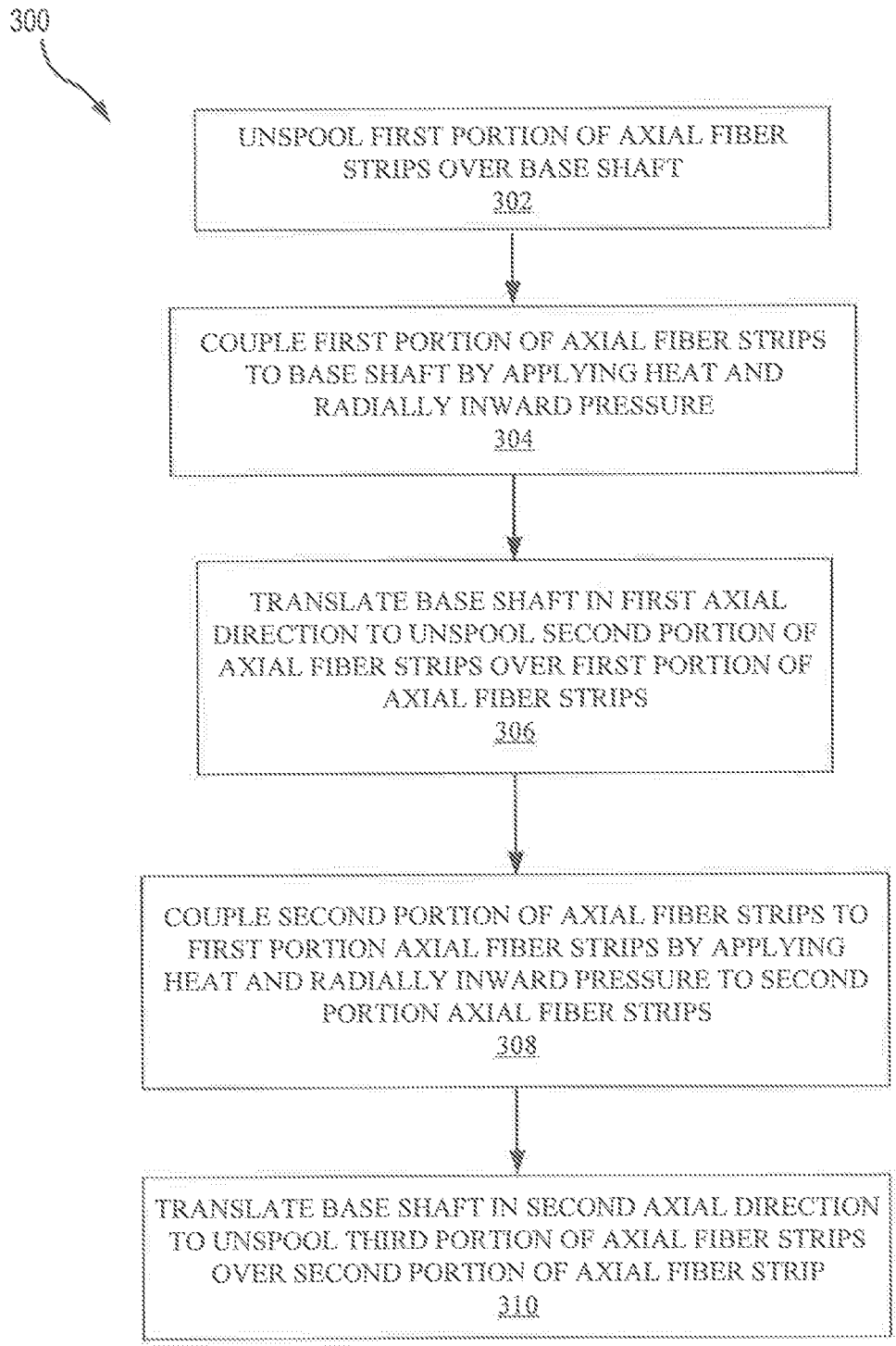
FIG. 7 illustrates a method of making a composite shaft, in accordance with various embodiments.

With reference to FIG. 7, a method 300 of forming a composite shaft is illustrated. In accordance with various embodiments, method 300 may comprise unspooling a first portion of a plurality of axial fiber strips over a shaft base (step 302), coupling the first portion of the plurality of axial fiber strips to the shaft base by applying heat and radially inward pressure to the first portion of the plurality of axial fiber strips (step 304), translating the shaft base in a first axial direction to unspool a second portion of the plurality of axial fiber strips over the first portion of the plurality of axial fiber strips (step 306), coupling the second portion of the plurality of axial fiber strips to the first portion of the plurality of axial fiber strips by applying heat and radially inward pressure to the second portion of the plurality of axial fiber strips (step 308), and translating the shaft base in a second axial direction to unspool a third portion of the plurality of axial fiber strips over the second portion of the plurality of axial fiber strip (step 310).

In various embodiments, step 304 may comprise depositing a first hoop fiber strip (e.g., first hoop fiber strip 128 in FIG. 2A) over the first portion of the of the plurality of axial fiber strips. In various embodiments, depositing the first hoop fiber strip over the first portion of the of the plurality of axial fiber strips may comprise translating a first hoop fiber strip dispensing assembly (e.g., circumferentially about the shaft base and in the first axial direction.

In various embodiments, step 304 may comprise translating a first consolidation element (e.g., first consolidation element 224 in FIG. 6A) over the shaft base in the first axial direction.

In various embodiments, step 308 may comprise depositing a second hoop fiber strip (e.g., second hoop fiber strip 152 in FIG. 2D) over the second portion of the plurality of axial fiber strips. In various embodiments, depositing the second hoop fiber strip over the second portion of the plurality of axial fiber strips may comprise translating a second hoop fiber strip dispensing assembly (e.g., second hoop fiber strip dispensing assembly 150 in FIG. 2D) circumferentially about the shaft base and in the second axial direction.

In various embodiments, step 308 may comprise translating a second consolidation element (e.g., second consolidation element 230 in FIG. 6B) over the shaft base in the second axial direction.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus for forming a composite shaft, the apparatus comprising:
   an axial fiber strip dispensing assembly including a plurality of fiber strip guides located circumferentially about a center axis, wherein the plurality of fiber strip guides is configured to dispense a plurality of circumferentially adjacent first fiber strips with the plurality of circumferentially adjacent first fiber strips extending in a generally axial direction; and
   a first hoop fiber strip dispensing assembly configured to dispense a second fiber strip circumferentially about the center axis, wherein the first hoop fiber strip dispensing assembly is configured to orient the second fiber strip such that a plurality of second fibers of the second fiber strip extend circumferentially about the center axis, wherein the first hoop fiber strip dispensing assembly is configured to translate axially toward the axial fiber strip dispensing assembly while the axial fiber strip dispensing assembly remains in a fixed axial position.

2. The apparatus of claim 1, further comprising a second hoop fiber strip dispensing assembly configured to dispense a third fiber strip circumferentially about the center axis, wherein the second hoop fiber strip dispensing assembly is configured to orient the third fiber strip such that a plurality of third fibers of the third fiber strip extend circumferentially about the center axis.

3. The apparatus of claim 2, wherein the first hoop fiber strip dispensing assembly is configured to dispense the second fiber strip while translating in a first axial direction, and wherein the second hoop fiber strip dispensing assembly is configured to dispense the third fiber strip while translating in a second axial direction opposite the first axial direction.

4. The apparatus of claim 1, further comprising a shaft support configured to translate the composite shaft axially relative to the axial fiber strip dispensing assembly.

5. The apparatus of claim 1, wherein the first hoop fiber strip dispensing assembly includes a consolidation element.

6. The apparatus of claim 1, wherein the axial fiber strip dispensing assembly further comprises a plurality of first fiber strip spools located circumferentially about the axial fiber strip dispensing assembly, and wherein the first hoop fiber strip dispensing assembly further comprises the second fiber strip and a second fiber strip spool configured to dispense the second fiber strip.

7. The apparatus of claim 6, wherein at least one of a fiber density, a fiber volume, or a fiber count of a first fiber strip dispensed from a first fiber strip spool of the plurality of first fiber strip spools is different from at least one of a fiber density, a fiber volume, or a fiber count of the second fiber strip, the plurality of circumferentially adjacent first fiber strips including the first fiber strip.

8. The apparatus of claim 1, wherein the axial fiber strip dispensing assembly comprises a plurality of first fiber strip spools and a plurality of second fiber strip spools, the plurality of second fiber strip spools being axially staggered with respect to the plurality of first fiber strip spools.

9. A method of forming a composite shaft, comprising:
   unspooling a first portion of a plurality of axial fiber strips over a shaft base, wherein the plurality of axial fiber strips is dispensed from an axial fiber strip dispensing assembly;
   coupling the first portion of the plurality of axial fiber strips to the shaft base by translating a first consolidation element over the shaft base in a first axial direction while the axial fiber strip dispensing assembly remains in a fixed axial position, wherein the first consolidation element applies heat and radially inward pressure to the first portion of the plurality of axial fiber strips;
   translating the shaft base in the first axial direction to unspool a second portion of the plurality of axial fiber strips over the first portion of the plurality of axial fiber strips;
   coupling the second portion of the plurality of axial fiber strips to the first portion of the plurality of axial fiber strips by translating a second consolidation element over the shaft base in a second axial direction, wherein the second consolidation element applies heat and radially inward pressure to the second portion of the plurality of axial fiber strips; and
   translating the shaft base in the second axial direction to unspool a third portion of the plurality of axial fiber strips over the second portion of the plurality of axial fiber strips.

10. The method of claim 9, further comprising depositing a first hoop fiber strip over the first portion of the of the plurality of axial fiber strips.

11. The method of claim 10, wherein depositing the first hoop fiber strip over the first portion of the of the plurality of axial fiber strips comprises translating a first hoop fiber strip dispensing assembly circumferentially about the shaft base and in the first axial direction.

12. The method of claim 11, further comprising depositing a second hoop fiber strip over the second portion of the plurality of axial fiber strips.

13. The method of claim 12, wherein depositing the second hoop fiber strip over the second portion of the plurality of axial fiber strips comprises translating a second hoop fiber strip dispensing assembly circumferentially about the shaft base and in the second axial direction.

14. The method of claim 13, wherein the first hoop fiber strip dispensing assembly includes the first consolidation element, and wherein the second hoop fiber strip dispensing assembly includes the second consolidation element.

15. An apparatus for forming a composite shaft, the apparatus comprising:
   an axial fiber strip dispensing assembly including a plurality of fiber strip guides located circumferentially about a center axis, wherein the axial fiber strip dispensing assembly is configured to dispense a plurality of circumferentially adjacent fiber strips, and wherein each fiber strip of the plurality of circumferentially adjacent fiber strips includes a plurality of fibers, and wherein the axial fiber strip dispensing assembly is configured to orient the plurality of circumferentially adjacent fiber strips such that the plurality of fibers extend in a generally axial direction; and
   a first consolidation element configured to apply heat and radially inward pressure against the plurality of circumferentially adjacent fiber strips, wherein the first consolidation element is configured to translate axially towards the axial fiber strip dispensing assembly while the axial fiber strip dispensing assembly remains in a fixed axial position.

16. The apparatus of claim 15, further comprising a second consolidation element located on a side of the axial fiber strip dispensing assembly opposite the first consolidation element, wherein the second consolidation element is configured to apply heat and radially inward pressure against the plurality of circumferentially adjacent fiber strips, and wherein the second consolidation element is configured to translate axially towards the axial fiber strip dispensing assembly.

17. The apparatus of claim 15, wherein the first consolidation element is configured to translate in a circumferential direction.

18. The apparatus of claim 15, wherein the axial fiber strip dispensing assembly is configured to dispense the plurality of circumferentially adjacent fiber strips adjacent to one another such that the plurality of circumferentially adjacent fiber strips jointly form an annular structure extending approximately 360° about the center axis.

19. The apparatus of claim 15, wherein the plurality of circumferentially adjacent fiber strips comprise at least one of pre-impregnated carbon fiber tow or slit fiber tape.

20. The apparatus of claim 15, wherein the plurality of circumferentially adjacent fiber strips comprise dry fiber strips.

* * * * *